(12) United States Patent
Mantripragada et al.

(10) Patent No.: US 8,176,001 B2
(45) Date of Patent: May 8, 2012

(54) SYSTEM AND METHOD FOR DETECTING SPAM OVER INTERNET TELEPHONY (SPIT) IN IP TELECOMMUNICATION SYSTEMS

(75) Inventors: Srinivas Mantripragada, Cupertino, CA (US); Amitava Mukherjee, San Ramon, CA (US); Rickard Per-Olof Sjöberg, Bandhagen (SE)

(73) Assignee: RedShift InterNetworking, Inc., Milpitas, CA (US)

( * ) Notice: Subject to any disclaimer, the term of this patent is extended or adjusted under 35 U.S.C. 154(b) by 784 days.

(21) Appl. No.: 12/254,730

(22) Filed: Oct. 20, 2008

(65) Prior Publication Data

US 2009/0106318 A1    Apr. 23, 2009

Related U.S. Application Data

(60) Provisional application No. 60/980,998, filed on Oct. 18, 2007.

(51) Int. Cl.
*G06F 17/00* (2006.01)
*G06F 15/16* (2006.01)
(52) U.S. Cl. ....................................................... 706/62
(58) Field of Classification Search .................... 706/45; 726/25
See application file for complete search history.

(56) References Cited

U.S. PATENT DOCUMENTS

| | | |
|---|---|---|
| 2002/0196782 A1 | 12/2002 | Furukawa et al. |
| 2003/0002676 A1 | 1/2003 | Stachura et al. |
| 2003/0128717 A1 | 7/2003 | Johnson et al. |
| 2004/0049701 A1 | 3/2004 | Le Pennec et al. |
| 2004/0148252 A1 | 7/2004 | Fleishman |
| 2004/0185931 A1 | 9/2004 | Lowell et al. |
| 2005/0005150 A1 | 1/2005 | Ballard |
| 2005/0288961 A1 | 12/2005 | Tabrizi |
| 2006/0182029 A1 | 8/2006 | Kealy et al. |
| 2006/0288420 A1* | 12/2006 | Mantripragada et al. ....... 726/25 |
| 2007/0110053 A1 | 5/2007 | Soni et al. |

OTHER PUBLICATIONS

R. Dantu, and P. Kolan, "Detecting Spam in VoIP Networks," in Proc. of the Steps to Reducing Unwanted Traffic on the Internet Workshop, pp. 31-37, Cambridge, MA, Jul. 2005.*
US2008/071388 Redshift Internetworking, Inc.—PCT Search Report and Written Opinion, U.S. Appl. No. 12/181,135, filed Oct. 22, 2008.
R. Dantu, and P. Kolan, "Detecting Spam in VoIP Networks," in Proc. of the Steps to Reducing Unwanted Traffic on the Internet Workshop, pp. 31-37, Cambridge MA, Jul. 2005.
U.S. Appl. No. 12/181,135 System and Method for Unified Communications Threat Management (UCTM) for Converged Voice, Video and Multi-Media Over IP Flows.
U.S. Appl. No. 12/254,735 "System and Method to Precisely Learn and Abstract the Positive Flow Behavior of a Unified Communication (UC) Application and Endpoints".

* cited by examiner

*Primary Examiner* — Jeffrey A Gaffin
*Assistant Examiner* — Ola Olude Afolabi
(74) *Attorney, Agent, or Firm* — Orrick, Herrington & Sutcliffe LLP (57) ABSTRACT

A method and system for detecting a spam over internet telephony (SPIT) is disclosed. Incoming call requests are received and analyzed using heuristic algorithms. A runtime action is provided based on the analysis using the heuristic algorithms. The heuristic algorithms include zero-touch heuristic algorithms that require no human intervention, one-touch heuristic algorithms that require human intervention one time, and multi-touch heuristic algorithms that require human intervention more than one time. Cumulative probability is calculated for each incoming call request, and the incoming call request is classified as a spam if the cumulative probability exceeds a threshold.

17 Claims, 7 Drawing Sheets

SYSTEM AND METHOD FOR DETECTING SPAM OVER INTERNET TELEPHONY (SPIT) IN IP TELECOMMUNICATION SYSTEMS

The present application claims the benefit of and priority to U.S. Provisional Patent Application No. 60/980,998 filed on Oct. 18, 2007, entitled "A 0-Touch Method And System For Preventing Spam Over Internet Telephony (SPIT) In IP Telecommunication Systems." U.S. Provisional Patent Applications 60/980,998 is hereby incorporated by reference.

FIELD

The field of the invention relates generally to communication over Internet Protocol (IP). In particular, the present method and system is directed to detection and classification of spam over Internet Telephony in IP telecommunication systems.

BACKGROUND

The emergence of Voice-over-IP (VoIP) and Unified Communications (UC) technology has caused a fundamental shift in the telecommunications industry. Due to numerous benefits of VoIP/UC systems ranging from low cost, manageability, pervasiveness of IP communication networks and easy integration with other IP-based software-enabled services, traditional Private Branch eXchange (PBX)/UC systems are increasingly replaced with their IP counterparts. The growing popularity of VoIP/UC networks is largely influenced by two benefits: cost savings achieved by migration from Public Switched Telephone Network (PSTN) to VoIP networks and the flexibility of adding new services and applications to the standard telephony platform. The underlying common IP-based communication platform enables richer application and services than were otherwise possible. The migration from PSTN to VoIP fundamentally has changed the communications landscape and the way various end-nodes of a network communicate with one another or with applications.

However, massive deployment of VoIP/UC faces challenges that need to be effectively addressed to gain widespread adoption. VoIP/UC solution providers need to provide high quality reliability and security standards that traditional PSTNs offer. Developing a robust architecture that adheres to these constraints is a challenging task.

A number of recent studies showed that nearly half of VoIP/UC service providers planning to deploy VoIP/UC networks affirm that current networks and applications are inherently insecure. The security issue is a major concern for VoIP/UC service providers because security vulnerabilities are not yet well understood, and preventive measures for security have not yet been fully adopted.

VoIP/UC security is vastly different from conventional data security due to the real-time nature of VoIP/UC communications. Real-time characteristics include: zero down time, near close to 100% Quality-of-Service (QoS), reliability, low latency overheads and security. VoIP/UC solutions need to comply with the complex VoIP/UC network standards involving a myriad of protocols, applications and devices while maintaining the dependency with existing PSTN systems. A VoIP UC network is a converged network of PSTN and IP-telephony, thus it is subject to security threats that potentially emanate from either one of the two networks. Due to the number of potential threat vectors arising from the convergence of PSTN and IP-telephony networks, the underlying security protection measures based on either one of the network architectures are not well suited to counterattack most of them. In addition, VoIP/UC networks require close-to-perfect reliability because of the real-time requirement for voice communication. For data-only communication, a typical response to a security attack involves a human intervention, which incurs significant time delays to reduce the scope of the threat and provides appropriate mitigation solutions. Unlike data-only communication, human interventions are inadequate for VoIP/UC communications, which require a real-time response to security threats.

VoIP/UC communication is highly sensitive to QoS parameters. A VoIP/UC security solution causing a noticeable loss in voice quality is unacceptable. Any interruption in the flow of packets, reassembly or jitter impacts the quality of voice conversation. For data communication, the lost data is retransmitted causing additional delay. While this may be acceptable for simple data communication, retransmission in the VoIP/UC realm implies that the caller has to repeat the lost voice message or reinvoke the UC service, which makes any solution that introduces time delay by retransmission an unacceptable solution.

Latency is another factor to consider when deploying VoIP/UC solutions. Modern data security solutions employ encryption and/or deep-packet inspection methods to improve security. Both of these methods introduce additional time delays and jitters to VoIP/UC packet streams, thus impacting the overall QoS of voice steams.

VoIP/UC networks interacting with and depending on existing PSTN networks pose a new set of challenges such as attack entry vectors and application threats. With a myriad of deployment solutions and architectures spanning the VoIP and traditional PSTN networks, the complexity of threat detection and mitigation grows exponentially.

The emergence of Voice-over-IP (VoIP), Unified Communications (UC) and Communications Enabled Business Process (CEBP) solutions has changed the way that enterprises communicate with each other. The convergence of voice and data into a single IP network creates a cost-effective transport mechanism that enables a new set of services. Voice, which was previously confined to a separate legacy network (e.g., PSTN), became ubiquitous and plays an integral role in communication among and bridging disparate entities. These entities include multiple users and user groups both inside and outside the enterprise, as well as advanced applications that enable communication with other entities anywhere, anytime with any device. The converged VoIP, UC and CEBP solutions need to comply with a myriad of protocols, applications and devices including the ones on legacy voice networks. These compliance requirements expose the convergent solutions to threat vectors that emanate from multiple entry points and pose formidable challenges with security and reliability.

SUMMARY

A method and system for detecting a spam over internet telephony (SPIT) is disclosed. Incoming call requests are received and analyzed using heuristic algorithms. A runtime action is provided based on the analysis using the heuristic algorithms. The heuristic algorithms include zero-touch heuristic algorithms that require no human intervention, one-touch heuristic algorithms that require human intervention one time, and multi-touch heuristic algorithms that require human intervention more than one time. Cumulative probability is calculated for each incoming call request, and the incoming call request is classified as a spam if the cumulative probability exceeds a threshold.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for detecting spams over internet telephony (SPIT) is disclosed. Each of the features and teachings disclosed herein can be utilized separately or in conjunction with other features and teachings to provide a method and system for detecting spams over internet telephony (SPIT). Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 1:
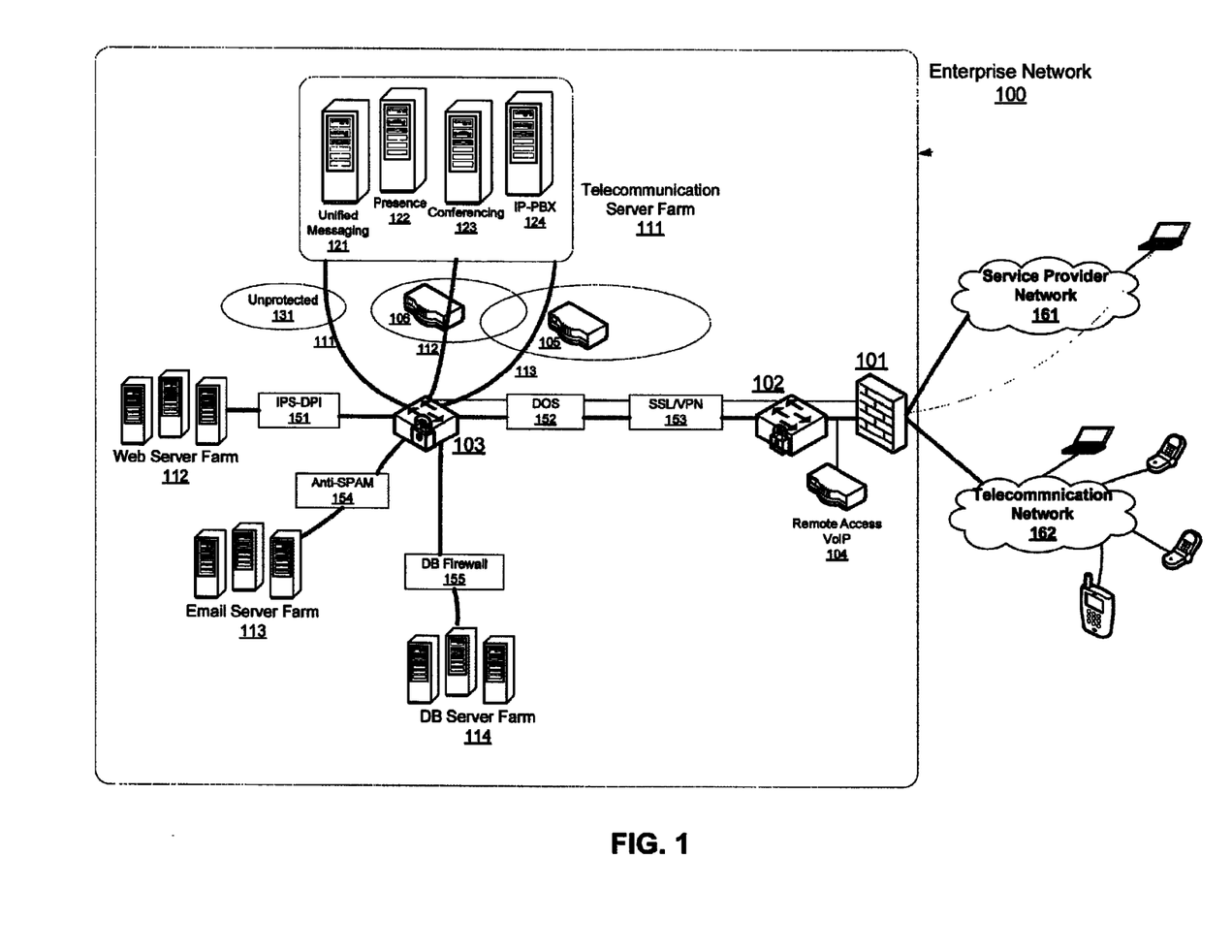
FIG. 1 illustrates an exemplary enterprise network including various server farms, according to one embodiment.

FIG. 1 illustrates an exemplary enterprise network including various server farms such as telecommunication server farm 111, Web server farm 112, email server farm 113 and database server farm 114, according to one embodiment. Telecommunication server farm 111 includes unified messaging (UM) server 121, presence server 122, conferencing server 123 and IP-PBX server 124. UCTM system 105 is placed in front of telecommunication server farm 111 and acts as a proxy-gateway solution inspecting both inbound and outbound traffic. UCTM system 105 applies different security policies to an application running at a server farm in addition to binding the application to an user or a group of users. This allows for applying different security policies at various endpoints depending on the trust level of the entry user group. For example, user groups whose identity are known a priori such as a mobile office employee or OEM partner connecting through Skype or SSL-VPN access may benefit from services providing flexible security policies.

Communication flows arrive at the forefront of enterprise network 100 from various external networks including service provider network 161 and telecommunication network 162. Such communication flows may arrive at firewall 101 from network devices or nodes having intention for security attack. Some types of security attacks are blocked or filtered by a series of enterprise routers 102, 103, Denial of Service (DOS) protection 152 or Secure Sockets Layer protection 153.

A typical UC service such as a Web conferencing session hosted by conferencing server 123 requires a valid registration, and communication flows potentially spanning multiple server farms. In particular, communication flows to telecommunication servers are subject to various levels of protection; communication flows 111 indicate unprotected communication flows. Communication flows 113 are protected by UCTM system 105 whereas communication flows 112 are protected by other vendors 106 for existing applications/servers, typically dedicated to a single application server.

Figure 2:
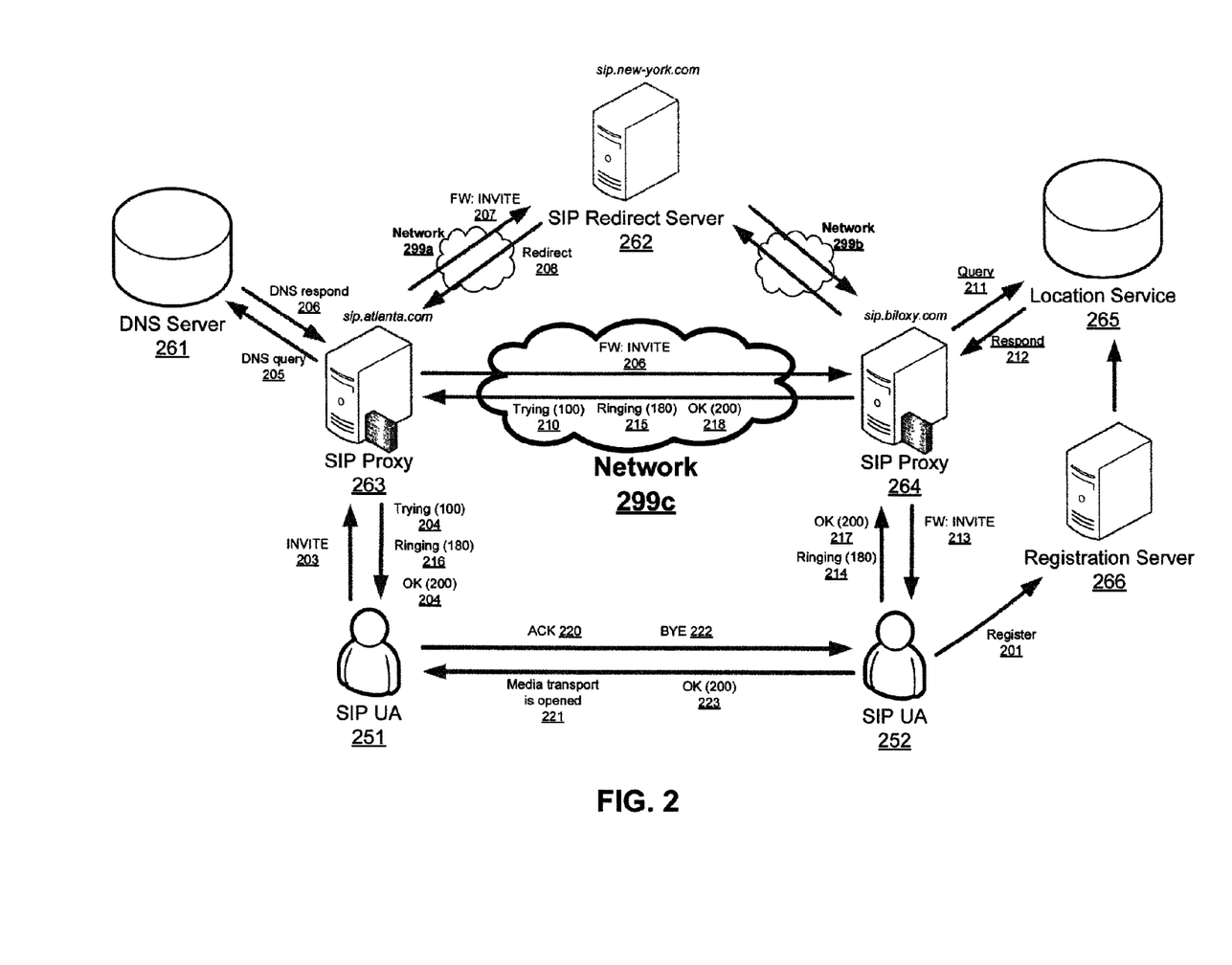
FIG. 2 illustrates an exemplary Session Initiation Protocol (SIP) flow involving a SIP call, according to one embodiment.

FIG. 2 illustrates an exemplary Session Initiation Protocol (SIP) flow involving a SIP call, according to one embodiment. User Agent (UA) 251 (sip:alice@atlanta.com) calls another UA 252 (sip:bob@biloxy).com). The SIP call starts with an invite message 203 from UA 251 to UA 252. SIP proxy server 263 (sip.atlanta.com) queries DNS server 261 to resolve UA 252's domain (biloxy.com) via 205 and 206 and requests SIP redirect server 262 to redirect UA 251's call request when UA 252 is outside the range of the SIP proxy server 263. After UA 251's call request arrives (sip.biloxy.com) either via SIP proxy server 263 or SIP redirect server 262 over network 299, SIP proxy server 264 queries location service 265 to resolve UA 252's internal address. UA 252's phone rings and, when followed by an affirmative response by UA 252, the media connection flow is directly established between UA 251 and 252.

UA's devices (phones, PDAs, etc.) are registered with a registration server prior to using SIP calls. For example, UA 252's phone number is registered with registration server 266 and its registration information is stored in location service 265. When an incoming call arrives, SIP proxy server 264 queries location service 265 to identify UA 252's phone number where the incoming call is redirected to.

Unified Communication threat management (UCTM) is a highly specialized solution designed for providing complete protection, visibility and control for voice-, video-, and multimedia-over-IP traffic. According to one embodiment, UCTM system 105 performs a blended approach to security combining stateful inspection, protocol anomaly detection and intrusion prevention with application-aware techniques such as voice Denial-Of-Service (DOS) protection, voice SPAM prevention and threat protection and policy enforcement for UC and CEBP applications. In addition, UCTM system 105 meets real-time traffic needs of the UC services. As a result, UCTM system 105 combines security services for data and voice to provide not only comprehensive protection against a plethora of voice, video and multimedia IP threats but also complete control and visibility of real-time traffic.

According to one embodiment, UCTM system 105 satisfies five categories or criteria to effectively address VoIP/UC security and deployment challenges.

Category I (real-time requirements) requires high reliability. For example, 99.999% uptime having less than 5 minutes of downtime per year needs to be guaranteed. In addition, real-time requirements also include low latency for media and signaling and stringent Quality-of-Service (QoS) jitter having less than 100 microseconds for media and 2 milliseconds for signaling.

Category II (security requirements) requires low tolerance to false-positives and false-negatives. Under this category, call re-attempts are not acceptable. UCTM system 105 employs encrypted traffic (e.g., SIP/TLS, SRTP).

Category III (technology requirements) requires capabilities for deep packet inspection from Layer 3 to Layer 7 VoIP and UC traffic. UCTM system 105 employs a heterogeneous architecture having both pro-active and reactive solution elements. It also maintains multiple levels of call state with adaptive behavioral learning of both UC applications and VoIP endpoints. It further provides advanced correlation of protocol state with security events across the different layers and security modules. Category III requirements comprehensively address VoIP, UC and CEBP application security threats such as SIP/SCCP/H.323 protocol anomaly detection, Intrusion Prevention System (IPS), voice DOS and SPAM over Internet Telephony (SPIT) prevention, eavesdropping, toll fraud, number harvesting, Man-in-the-middle (MITM) attacks as well as UC-aware policy and incident management system.

Category IV (enterprise focus) requires deeper interoperability with disparate systems. Complex services spanning multiple protocols are employed. UCTM system 105 employs zero-touch deployment requirement under this category.

Category V (UC and CEBP communications focus) requires tight integration with IP-PBX and other communication infrastructure elements for the ease of deployment and manageability. Third party vendor solutions providing UC and SOA services (e.g., Microsoft, SAP, BEA, IBM) are easily integrated. Under Category V, all VoIP and UC traffic are visible, and controls of all UC services, applications and assets are provided.

Intrusion Detection System (IDS) and Intrusion Prevention System (IPS) vendors are strong in enterprise focus (Category IV) but are not well suited to meet real-time requirements (Category I). They have a high degree of false-positives (Category II) and lack technological elements (e.g., advanced call state correlation) required to address complex blended threats that may span multiple VoIP/UC protocols (Category III). Conventional data security solutions also lack UC and CEBP communication focus (Category V).

UTM vendors provide solutions that are very similar to that of IDS/IPS vendors but lack best-of-breed solution and technological elements. They provide solutions that are better suited for price sensitive small and medium businesses (SMB) at a significantly lower price. UTM devices are mired in performance related issues and do not provide solutions under Categories II, III and V.

Session Border Controller (SBC) vendors provide security solutions that are very strong in Category I (real-time) and adequate for carrier and edge (or border) protection deployments. They are, however, not enterprise-focused, therefore lack the necessary technological and solution elements required for providing adequate UC and CEBP application security (Categories III, IV and V).

Existing IP-PBX players are primarily focused on providing end-user voice solutions and equipment. Their solutions are strong in real-time (Category I), enterprise (Category IV) and UC focus (Category V) but are not focused on providing security solutions (Category II and III).

Conventional security solutions such as IDS/IPS appliances, network firewalls, UTM and/or SBC vendors are not well suited for addressing the complex VoIP and UC security requirements and deployment challenges.

Figure 3:
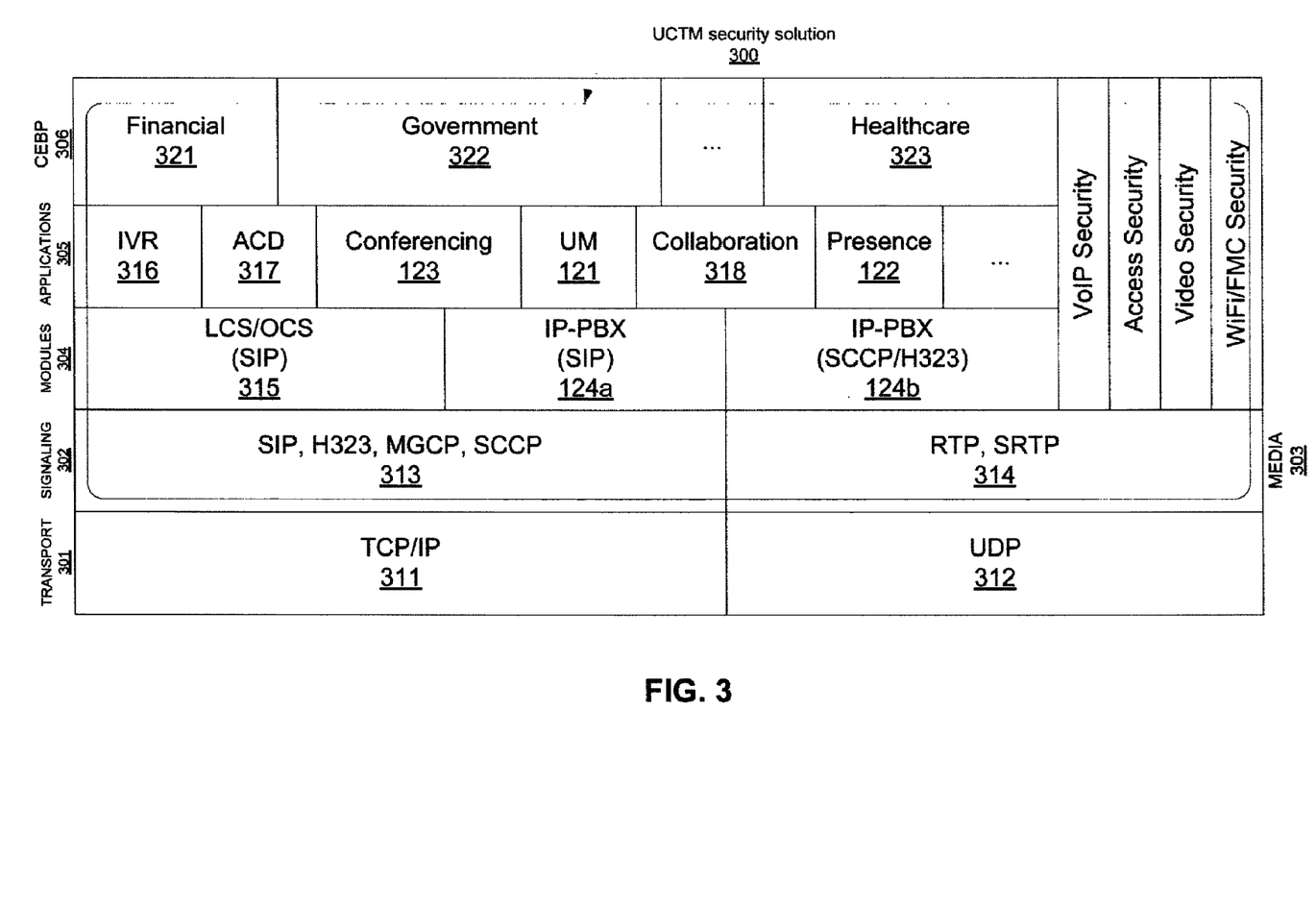
FIG. 3 illustrates an exemplary UCTM security solution that correlates protocol endpoint and application transaction states across signaling, media, modules, applications and Communications Enabled Business Process (CEBP), according to one embodiment.

FIG. 3 illustrates an exemplary UCTM security solution that correlates protocol, endpoint and application transaction states across signaling, media, modules, applications and CEBP, according to one embodiment. Signaling layer 302 includes VoIP protocols 313 such as SIP, H.323, Media Gateway Control Protocol (MGCP) and Skinny Call Control Protocol (SCCP) as well as media protocols 303 such as Real-time Transport Protocol (RTP) and Secure RTP (SRTP)

protocols 314. Modules 304 include communications servers 315 such as Office Communications Server (OCS), Live Communications Server (LCS) and IP-PBX servers 124. Exemplary UCTM applications 305 include Interactive Voice Response (IVR) 316, Automated Call Distribution (ACD), conferencing (Web or voice) 123, Unified Messaging (UM) 121, collaboration 318 and presence applications 122. CEBP applications 306 are tailored for unique business processes such as financial 321, government 322 and healthcare applications 323. Current solutions are limited to individual silos but UCTM security solution provides a unified solution across signaling, media, modules, applications and CEBP layers. For example, a communication signal without deep packet inspection and stateful analysis results in an attack that is not correctly identified or detected.

Several thousand threats for VoIP have been compiled from various sources, such as VOIPSA group, CERT, BugTraq and other vulnerability postings from several vendors. VoIP deployment is hampered by a variety of threats at different entry points and attack vectors that exploit weaknesses. Such weaknesses exist in network layer, underlying OS, network protocol, application layer and/or device configuration.

Figure 4:
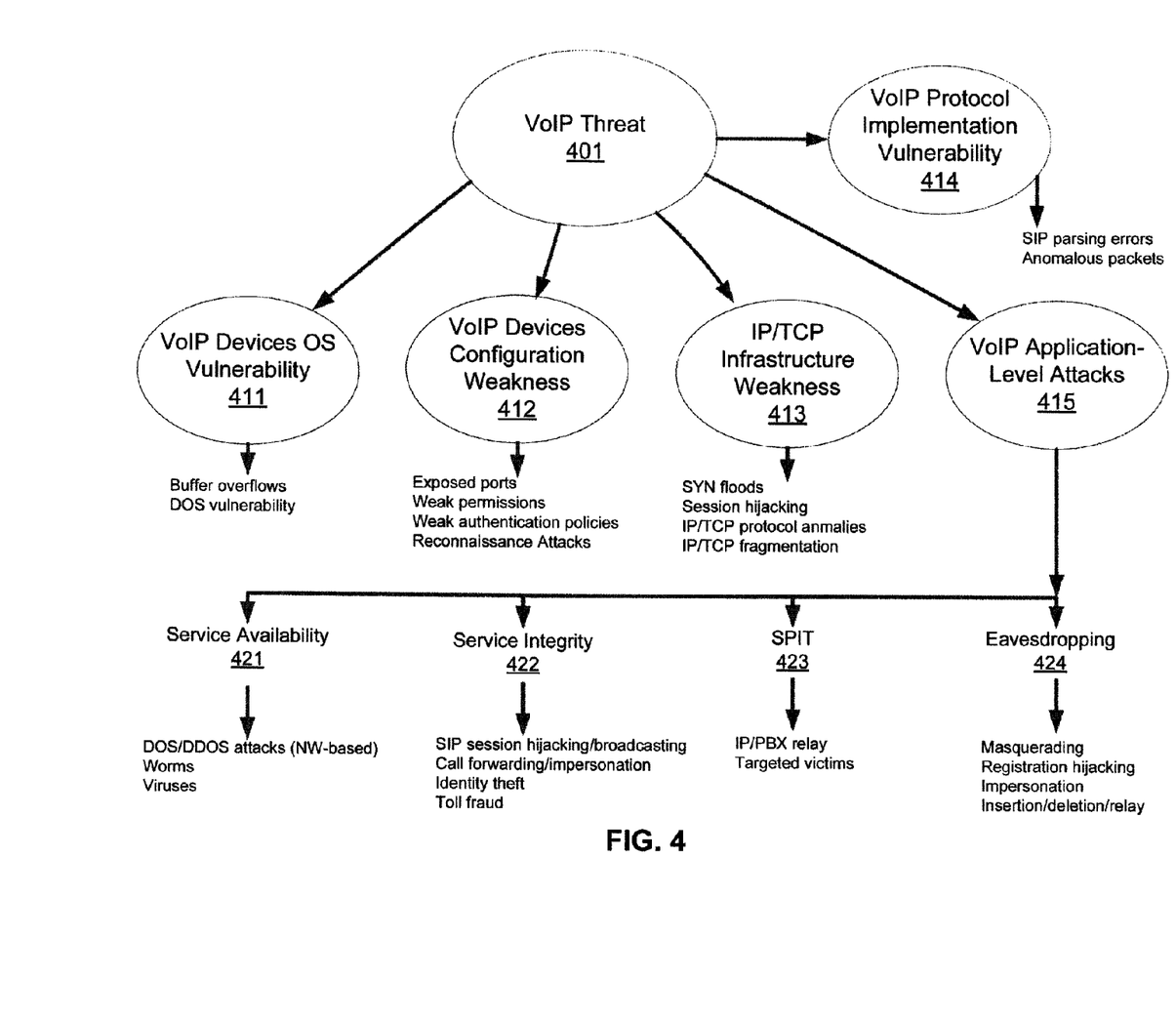
FIG. 4 illustrates exemplary VoIP threats categorized by common attack types with similar entry methods and common vulnerability exploitation, according to one embodiment.

FIG. 4 illustrates exemplary VoIP threats 401 categorized by common attack types with similar entry methods and common vulnerability exploitation, according to one embodiment. Categorizing VoIP threats helps better understand various VoIP threat vectors such that a common effective security solution for each category is formulated.

VoIP device OS vulnerability 411 includes VoIP threats from VoIP devices such as IP phones, call managers, gateways, registration and other proxy servers run an operating system (OS). Compromise of the underlying OS leads to an integrity compromise of the VoIP device running the OS. Most of the VoIP devices run on traditional operating systems (e.g., Windows, Linux, RTOS) that are vulnerable with numerous exploits that are publicly available. For example, buffer overflow against a device OS is a well-known attack exploiting VoIP Device OS vulnerability. Denial-of-Service (DoS) triggered by fragmented UDP packets is another example under this category.

VoIP device configuration weakness treats 412 refer to the threats penetrating through VoIP infrastructures due to weaknesses in configurations such as open TCP/UDP ports, open file shares with global read/write permissions or temporary folders with weak permissions, etc. As a result, the services running on the VoIP device become vulnerable to a wide variety of attacks resulting in either a loss of service or a compromise of the VoIP device. For example, a known SIP-based phone telnet service allows the telnet service to be exploited by an attacker due to weak password permissions set on the VoIP device. In addition, Simple Network Management Protocol (SNMP) services offered by the VoIP device are vulnerable to reconnaissance attacks, and valuable information is gathered from an IP phone by using SNMP queries with the "public" community name.

IP/TCP infrastructure weakness threats 413 rely on transport protocols such as TCP/IP 311 or UDP 312. The availability of a VoIP/UC service depends on the availability of the underlying IP/TCP infrastructure. VoIP protocols rely on TCP and UDP as transport mediums and hence are also vulnerable to attacks that TCP and UDP are generally exposed to such as DOS/DDOS, session hijacking, protocol anomalies, etc. and cause an undesirable behavior on the VoIP services.

VoIP protocols implementation vulnerability threats 414 rely on the VoIP protocols such as SIP, H.323 that are relatively new standards. Both the protocol specifications and the subsequent implementations need to mature to reduce the overall threat exposure. Examples include parsing errors, NULL packets, anomalous packets, RFC violations etc. Several vulnerabilities are discovered in vendor implementations of VoIP products that use H.323 and SIP.

According to one embodiment, VoIP application-level threats 415 are grouped into the following four categories based on various entries and injection mechanisms: service availability attacks 421, service integrity attacks 422, SPAM over Internet Telephony (SPIT) 423 and eavesdropping attacks 424.

Service availability attacks 421 are focused on disrupting the availability of VoIP services. The unavailability of a critical service has a direct customer impact, lost revenues, unplanned downtimes and maintenance costs. Such examples include VDOS attacks, remote code injection and viruses or worm-based threats. The affected clients are end-user VoIP applications, phones, soft-clients, call managers, registration servers, etc. Due to the real-time nature of VoIP applications, any disruption in service causes tremendous business impact including financial loss and loss of productivity.

Service integrity attacks 422 are focused on compromising the integrity of VoIP services. These attacks are very targeted and usually difficult to detect. These attacks ruin the reputation and brand name of the service provider, and result in leakage of sensitive information by phishing attacks. Some examples of service integrity attacks include collaboration session hijacking, redirecting existing media conversations to an attacker's machine, classic man-in-the-middle (MITM) attack, broadcast hijacking, identity theft, conversation alteration, impersonation and toll fraud.

SPIT attacks 423 impose potential threats like its email counterpart. With increasing deployment of IP solutions, SPIT is expected to be an attractive choice for spammers due to its low cost and pervasiveness of the Internet. Conventional SPAM methods adopted by telemarketers require a human presence manually dialing the phone numbers and making the voice connections. This attack pattern is drastically changed with IP networks, as even a simple computer script can flood vulnerable corporate phone systems with SPAMs.

Eavesdropping attacks 424 allow attackers to obtain sensitive business or personal information otherwise deemed confidential. The eavesdropping mechanism exploits intercepting and reading of messages and conversations by an unintended party. Once the information is collected and translated, various Man-in-the-Middle (MITM) attacks can be launched (e.g., reading, inserting, modifying the intercepted messages). Some examples include masquerading, registration hijacking, impersonation and replay attacks.

The last decade has seen a rise in several best-of-breed point security products to overcome the challenges presented by ever changing threats including network firewalls, SSL VPN appliances, DOS protection, anti-virus, IDS/IPS, anti-SPAM and content filtering solutions. All of these point products provide best-of-breed protection for the threats that they are well adept with. However, these products typically work in isolation in the network with limited end-to-end system visibility and control. Oftentimes, the Layer 3-7 networking stack functions are executed multiple times without good inter-communication between them. In addition, each product provides its own management console presenting unique challenges for effective end-to-end network configuration with correct policies.

Deployment and management of these point products became a big challenge for enterprise networks. This leads to the rise of Unified Threat Management (UTM) solutions that provide several of the above features in a single box. In general, deploying a single multi-function device reduces costs and overall management. Each of the security functions works in loosely coupled form but the common UTM framework provides a central management console of managing and configuring the product. There are widely perceived deployment challenges faced by current UTM solutions: performance bottlenecks, scalability, not best-of-breed solutions, architectural limitations and reliability. Current UTM solutions are also very much limited to enterprise data networks.

Voice/video, multimedia and other Unified Communications (UC) pose a different set of challenges. Real-time communication mandates high reliability and requires near perfect latency, low jitter with near-zero false-positives and negatives. The real-time requirements present challenges for conventional enterprise-focused UTM solutions that are deployed in data-centric networks.

SPIT calls are detected in a manner that is different from detecting email spam due to the real time nature of SPIT calls. It is necessary to detect SPIT attacks with near-zero false positives where normal calls are passed through unperturbed and with only tolerable false negatives by minimizing the rate of pass-through SPIT calls. Preferably, zero-touch heuristics for determining SPIT calls is used to prevent human intervention. When zero-touch heuristics cannot be used and/or on a case by case basis, one-touch heuristics is used with minimal human intervention. According to one embodiment, the present system and method is deployed to an existing environment with minimal interruption and down-time. The general goal of the present system and method is to provide SPIT detection and classification with minimal human intervention and with minimal delay for processing.

The present system and method for detecting SPIT in IP telecommunication systems combines the capabilities offered by individual component methods described below and efficiently blocks SPIT calls with high fidelity and with minimal callee/caller interaction.

According to one embodiment, various heuristic methods are employed to detect SPIT calls with tagged probabilities. Each positive analysis of a given heuristic does not necessarily imply that a SPIT call is detected, but instead each proposed heuristic is given a priority. When the cumulative sum of the priorities and/or the rate of detection exceeds a threshold, the call is classified as a SPIT. The threshold is determined by many factors including the call profile (i.e., the sender's profile) and the call category.

According to one embodiment, the following zero-touch heuristic detection methods are used, but not limited thereto. Call Duration Tacking (CDT) tracks the calls from the same user having the same duration, either very short or abnormally long. Such calls are often automated messages. These calls detected by the duration are recorded in a blacklist. Call Bombing Detection (CBD) detects calls from a single user simultaneously. Simultaneous Calls Detection (SCD) checks if a single user takes part in several call sessions simultaneously. Call Rate Tracking (CRT) checks the calling rate of a caller within a configurable time window and determines whether the caller is making simultaneous SPIT calls. Detection of Machine-generated Requests (DMR) tracks for possible machine generated fields from a single or multiple call requests and determines whether specific call is a SPIT attack. IP/Domain Correlation (IPD-C) correlates the IP address information and domain name and identifies suspicious call requests within a time window. Error Response Learning (ERL) tracks the number of error messages/responses in reply to invite messages, such as 404, 603, 500 and 486. The error messages/responses in reply to invite messages indicate that some fields in the SIP message are bad, forged or aliased inputs.

According to one embodiment, the following one-touch heuristic detection methods are used, but not limited thereto. One-touch heuristics are selectively employed if for some reason the zero-touch heuristics fail to conclusively decide whether a call is legitimate or a SPAM. One-touch heuristics are efficient in precisely filtering SPIT attacks but are more intrusive than zero-touch heuristics that are invisible to the caller/callee. One-touch heuristics include but are not limited to Turing Tests (TT) and Callee Notification (CN). A Turing Test is an automated test requiring human interaction and involves an automated conversational message including questions that a machine cannot answer. Callee Notification (CN) relies on a callee's feedback responses after calls that ultimately affect the reputation of the caller. Multi-touch heuristics include but are not limited to Feedback Learning Engine (FLE). Feedback Learning Engine (FLE) learns the information about a call request from a caller based on the feedback of the call. When a new call request is made by the same caller who is identified as a spammer, FLE blocks the call request and prevents it from reaching the receiver. The feedback information may be received by the call receiver or by other runtime finite state machines (FSMs). The collected information is stored in a database and referenced by the FLE for checking the legitimacy of new calls.

Figure 5:
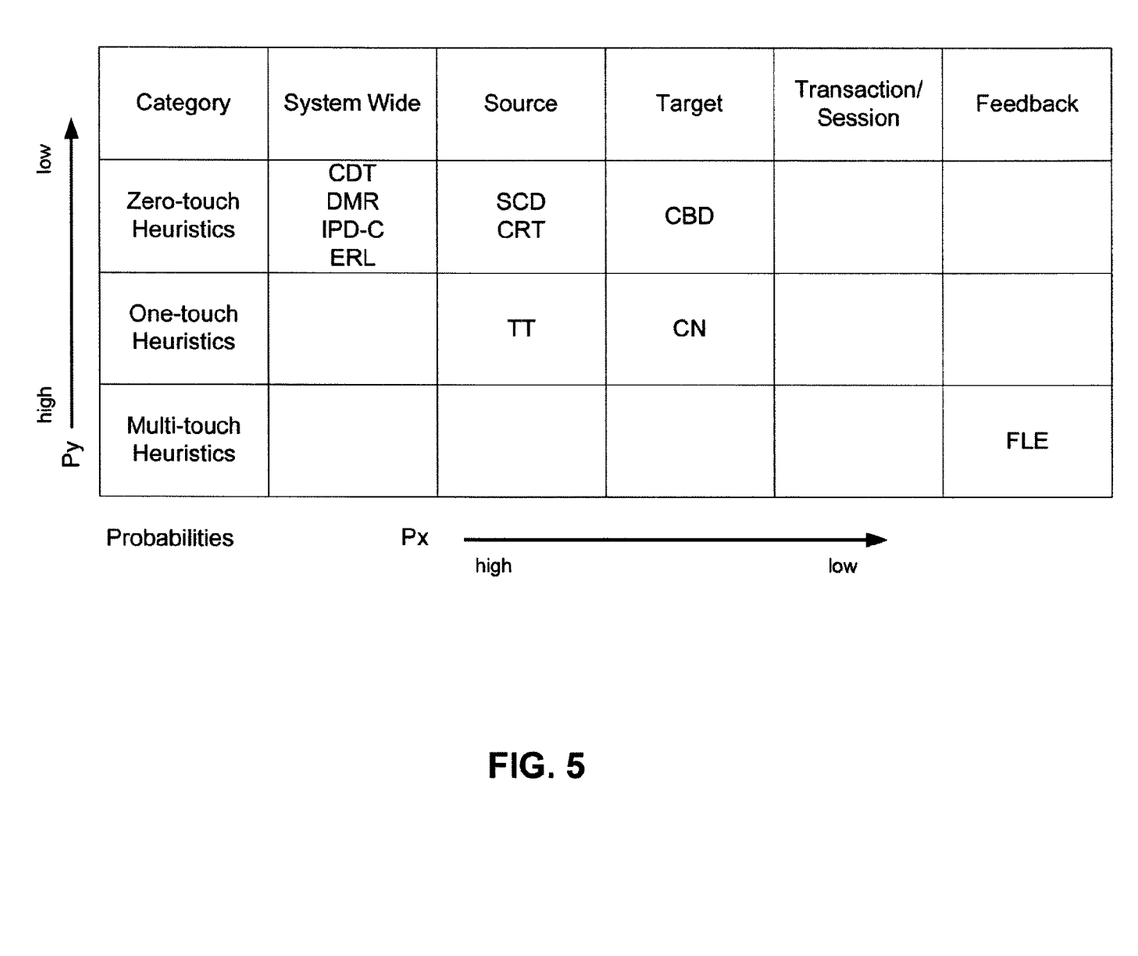
FIG. 5 illustrates exemplary logical groups of SPIT detection heuristics, according to one embodiment.

FIG. 5 illustrates exemplary logical groups of SPIT detection heuristics, according to one embodiment. Each row represents touch type of the heuristic classified by its probability (zero-touch, one-touch, multi-touch), and each column represents the property of the heuristic classified by its probability (system-wide, source, target, transaction session, feedback, etc.) For example, system-wide heuristics have better fidelity and higher probability compared to source heuristics. One-touch heuristics have higher probability for detecting a SPIT call compared to zero-touch heuristics. The cumulative probability of the touch type and property probabilities is determined for each combined category.

For a call flow instance, multiple heuristics can trigger a net cumulative probability that results in a higher chance of SPIT call detection. In one embodiment, the net cumulative probability is determined by the following equation:

Cumulative Probability (CP)=$\Sigma PxPy$ (zero-touch)+
$\Sigma PxPy$ (one-touch)+$\Sigma PxPy$ (multi-touch)

If the cumulative probability is greater than a threshold value, SPIT call is detected.

Figure 6:
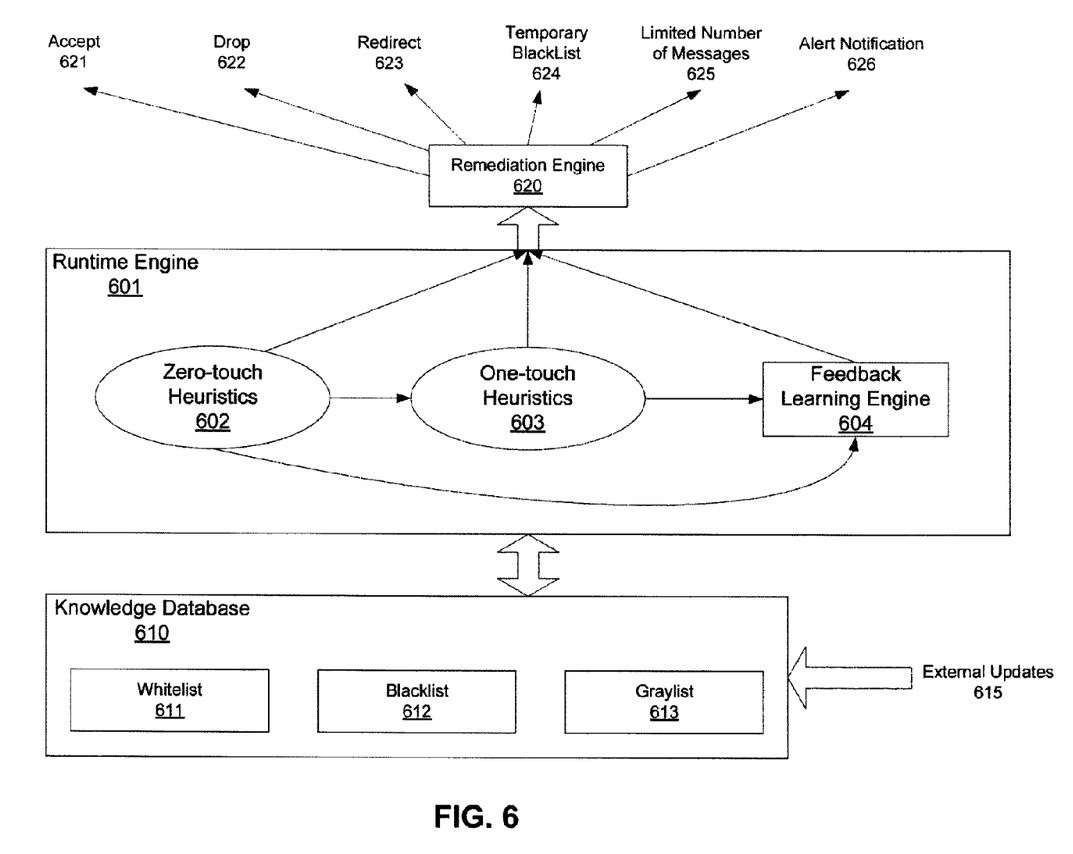
FIG. 6 illustrates an exemplary SPIT runtime system, according to one embodiment.

FIG. 6 illustrates an exemplary SPIT runtime system, according to one embodiment. SPIT runtime system 600 includes knowledge database 610, a runtime engine 601, and a remediation engine 620. Each caller's profile and category is enumerated as one of three possible types: whitelist 611, blacklist 612, and graylist 613. Whitelist 611 contains an internally qualified set of well-behaved calls and users. Calls associated with whitelist 611 is allowed by default. Blacklist 612 contains an internally qualified set of calls and users that are identified as SPIT calls. Calls associated with blacklist 612 are denied by default. Graylist 613 contains any call or user that is neither in whitelist 611 nor blacklist 612. New calls or calls with no prior information are listed in graylist 613.

Each blacklist entry stores unique call record/identifiers marked as SPIT call by runtime engine 601. Each whitelist entry stores all call records that have been identified as legitimate calls by runtime engine 601. Any calls with no prior history or record in either the whitelist 611 or blacklist 612 are automatically entered into graylist 613. Calls listed in graylist 613 are closely monitored by runtime engine 601 and updated to enter into a different list group depending on the updated classification. Periodically, well behaved and good entities from graylist 613 are updated to be listed in whitelist 611 upon meeting certain conditions, described below.

According to one embodiment, relisting from graylist 613 to whitelist 611 occurs by satisfying one or more of the following conditions. 1) Calls are satisfactorily completed with a cumulative score exceeding a threshold value. 2) The user has an authenticated identity, i.e., a federated user or a registered user. 3) The user has a prior well-behaving record in the database. For example, the users is added when the UCTM system operates in a staging mode where the communication flows among well-behaving users are learns in a secured environment. 4) The user is part of a domain network that is presumed to be trusted. 5) Calls are generated from a trusted device. It is appreciated that the above-described transition conditions are for exemplary purposes only, and other transition conditions may be employed without deviating the scope of the present subject matter.

In a similar fashion, ill-behaved or suspicious calls continue to remain in graylist 613 or, if its SPIT detection occurrences exceed a threshold value, the calls are demoted to blacklist 612.

According to one embodiment, runtime engine 601 contains the three components: zero-touch heuristics engine 602, one-touch heuristics engine 603, and feedback learning engine 604. Zero-touch heuristics engine 602 operates as a finite state machine (FSM) requiring no human intervention. One-touch heuristics engine 603 also operates as a finite state machine (FSM), but requires human intervention to validate and invalidate SPIT calls. Feedback learning engine 604 also operates a finite state machine (FSM) that actively learns the behavior and scores recommended by the zero-touch and one-touch heuristics engines 602 and 603.

According to one embodiment, incoming calls are analyzed by zero-touch heuristic engine 602 one-touch heuristic engine 603, and feedback learning engine 604 in series. The results of the analysis by each of heuristic engines 602-604 are compiled together to calculate cumulative probability, CP, to determine which action to take in response to the call request.

The results of a call coming out from zero-touch and one-touch heuristics engines 602 and 603 fall into one of three outcomes. The call is determined to be legitimate, the call is determined to be a SPIT attack, or no conclusion is drawn with the call.

A call which has already been identified to be legitimate by zero-touch heuristics engine 602 may not need to be further examined and can be directly established. Feedback learning engine 604 maintains all active call states, records the completion times, gathers the result received from heuristics engines 602 and 603, and updates knowledge database 610 periodically or on an as-needed-basis. Knowledge database 610 may be initially constructed by the administrator using a staging mode and subsequently updated by external updates.

According to one embodiment, remediation engine 620 applies the results from runtime engine 601 and determines which actions to take toward an incoming call. The accept action 621 accepts the call request with no further action. The drop action 622 drops and prevents the call request from reaching the server (not shown). The redirect action 623 redirects the original call request to a different location, usually for further analysis. The temporary blacklist action 624 temporarily disallows the origination source from making future calls. The temporary blacklist action 624 may imply a time window that expires before the source can make another legitimate call. The limited number of message action 625 limits the number of messages or calls that a resource can make simultaneously. The alert action 626 generates notification alerts to the server but does not disrupt the originating call request.

Figure 7:
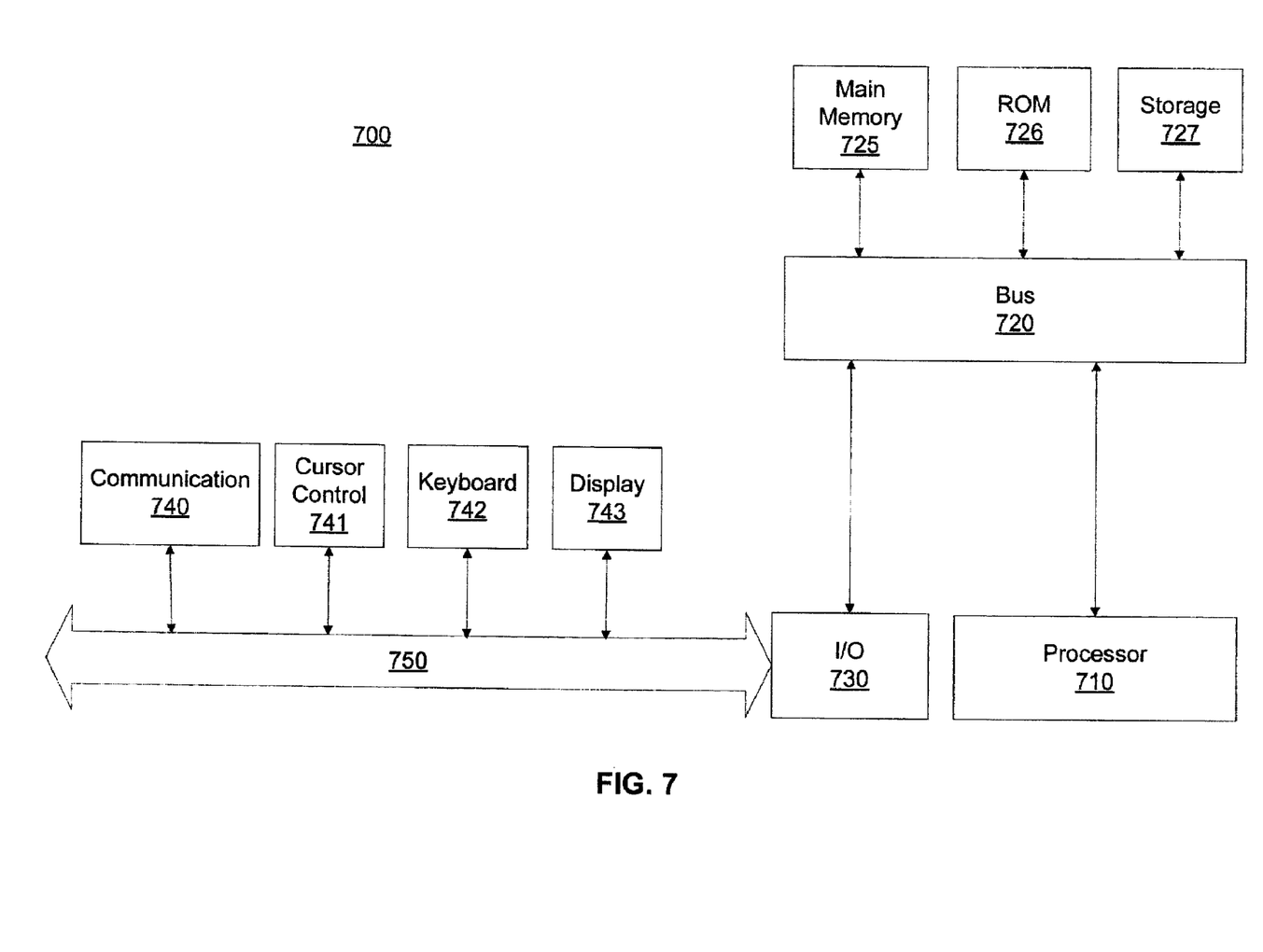
FIG. 7 illustrates an exemplary computer architecture for use with the present system, according to one embodiment.

FIG. 7 illustrates an exemplary computer architecture 700 for use with the present system, according to one embodiment. Computer architecture 700 can be used to implement a UCTM system 105 with all or a part of the components shown in FIG. 7. One embodiment of architecture 700 comprises a system bus 720 for communicating information, and a processor 710 coupled to bus 720 for processing information. Architecture 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Architecture 700 also may include a read only memory (ROM) and/or other static storage device 726 coupled to bus 720 for storing static information and instructions used by processor 710.

A data storage device 727 such as a magnetic disk or optical disc and its corresponding drive may also be coupled to computer system 700 for storing information and instructions. Architecture 700 can also be coupled to a second I/O bus 750 via an I/O interface 730. A plurality of I/O devices may be coupled to I/O bus 750, including a display device 743, an input device (e.g., an alphanumeric input device 742 and/or a cursor control device 741).

The communication device 740 allows for access to other computers (servers or clients) via a network. The communication device 740 may comprise a modem, a network interface card, a wireless network interface or other well known interface device, such as those used for coupling to Ethernet, token ring, or other types of networks.

A method and system for detecting spams over internet telephony (SPIT) has been described with respect to specific examples and subsystems. It will be apparent to those of ordinary skill in the art that it is not limited to these specific examples or subsystems but extends to other embodiments as well.

We claim:

1. A computer-implemented method, comprising:
    receiving an incoming call request;
    analyzing the incoming call request using heuristic algorithms, wherein said heuristic algorithms include zero-touch heuristic algorithms that require no human intervention, one-touch heuristic algorithms that require human intervention one time, and multi-touch heuristic algorithms that require human intervention more than one time;
    providing a runtime action based on the analysis using said heuristic algorithms;
    detecting a spam over internet telephony (SPIT);
    calculating cumulative probability for the incoming call request, wherein the cumulative probability adds the probability of the zero-touch heuristic algorithms, the one-touch heuristic algorithms, and the multi-touch heuristic algorithms; and
    classifying the incoming call request as a spam when the cumulative probability exceeds a threshold.

2. The computer-implemented method of claim 1, wherein the zero-touch heuristic algorithms include call duration tracking (CDT), detection of machine-generated requests (DMR), IP/domain correlation (IPD-C), error response learning (ERL), simultaneous calls detection (SCD), call rate tracking (CRT), and call bombing detection (CBD).

3. The computer-implemented method of claim 1, wherein the multi-touch heuristic algorithms include feedback learning engine (FLE).

4. The computer-implemented method of claim 1, wherein the threshold is determined by the call profile and the call category.

5. The computer-implemented method of claim 1, wherein said incoming call request is analyzed in reference to a database that stores list of calls and users.

6. The computer-implemented method of claim 5, wherein the database classifies the stored calls and users into a whitelist, a blacklist, and a graylist, wherein the whitelist contains the calls and users with legitimate , the blacklist contains the calls and users with malignant intention, and the graylist contains the calls and users that are listed neither in the whitelist nor the blacklist.

7. The computer-implemented method of claim 5 further comprising:
relisting said incoming call request from one list of the whitelist, the blacklist, and the graylist to another list of the whitelist, the blacklist, and the graylist.

8. The computer-implemented method of claim 1, wherein the runtime action is provided by a remediation engine.

9. The computer-implemented method of claim 8, wherein the runtime action is one of accept, drop, redirect, temporary blacklist, limited number of message, and alert notification.

10. A system, comprising:
a processor; and
software instructions executable by the processor, the software instructions for configuring the processor to provide
a runtime engine that receives an incoming call request and analyzes the incoming call request using heuristic algorithms; and
a remediation engine that provides a runtime action to the incoming call request, wherein the runtime action determines whether the incoming call request is a spam over internet telephony (SPIT);
wherein said heuristic algorithms include zero-touch heuristic algorithms that require no human intervention, one-touch heuristic algorithms that require human intervention one time, and multi-touch heuristic algorithms that require human intervention more than one time; and
wherein said runtime engine calculates cumulative probability for the incoming call request, wherein the cumulative probability adds the probability of the zero-touch heuristic algorithms, the one-touch heuristic algorithms, and the multi-touch heuristic algorithms and classifies the incoming call request as a spam when the cumulative probability exceeds a threshold.

11. The system of claim 10, wherein the zero-touch heuristic algorithms include call duration tracking (CDT), detection of machine-generated requests (DMR), IP/domain correlation (IPD-C), error response learning (ERL), simultaneous calls detection (SCD), call rate tracking (CRT), and call bombing detection (CBD).

12. The system of claim 10, wherein the multi-touch heuristic algorithms include feedback learning engine (FLE).

13. The system of claim 10, wherein the threshold is determined by the call profile and the call category.

14. The system of claim 10, further comprising a database that stores list of calls and users, wherein said incoming call request is analyzed in reference to the database.

15. The system of claim 14, wherein the database classifies the stored calls and users into a whitelist, a blacklist, and a graylist, wherein the whitelist contains the calls and users with legitimate , the blacklist contains the calls and users with malignant intention, and the graylist contains the calls and users that are listed neither in the whitelist nor the blacklist.

16. The system of claim 14, wherein said incoming call request is relisted from one list of the whitelist, the blacklist, and the graylist to another list of the whitelist, the blacklist, and the graylist.

17. The system of claim 16, wherein the runtime action is one of accept, drop, redirect, temporary blacklist, limited number of message, and alert notification.

* * * * *